Jan. 5, 1932.  H. C. BAUM  1,839,731
CONFECTION MAKING APPARATUS
Filed Feb. 5, 1930  4 Sheets-Sheet 1
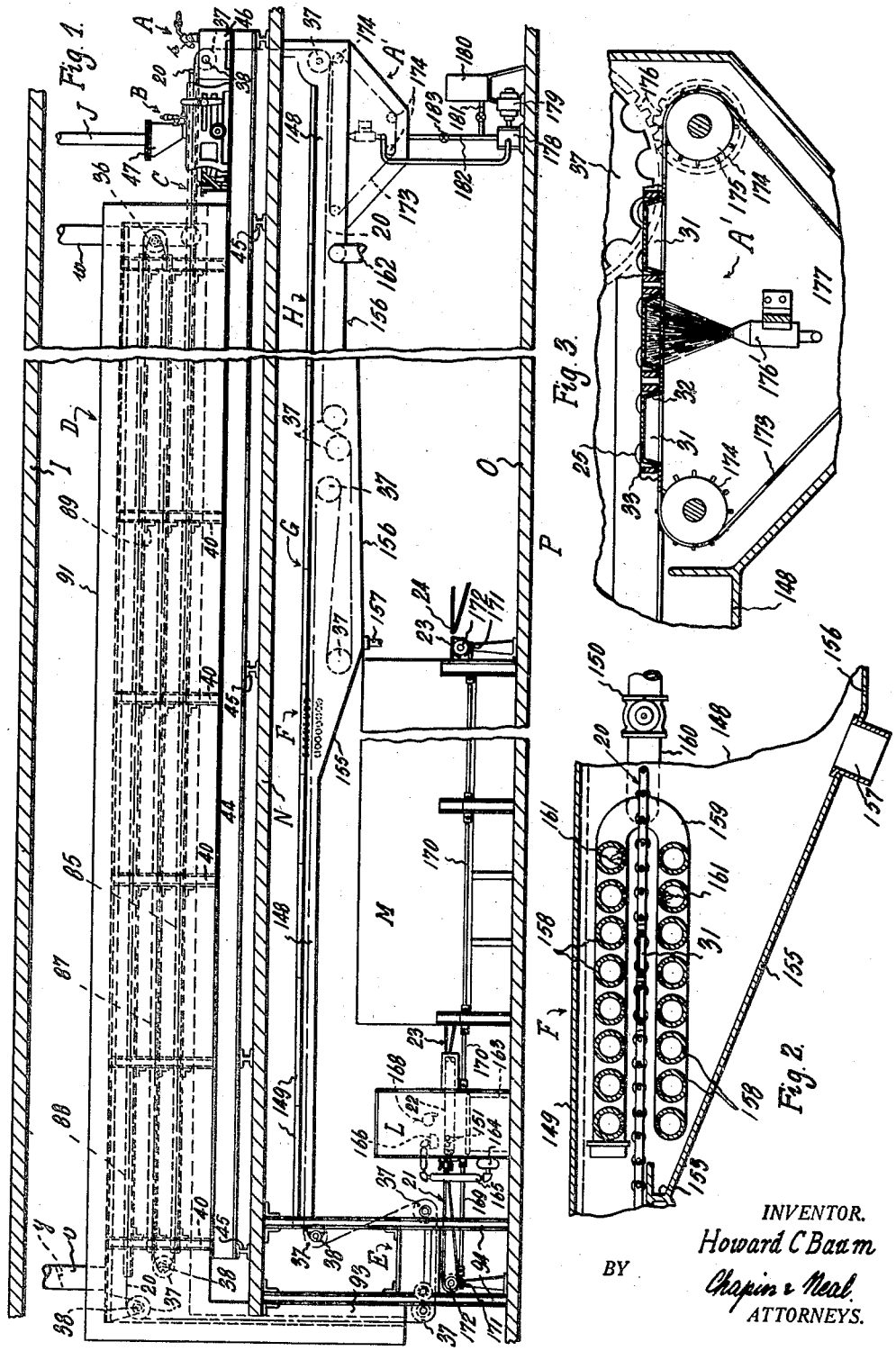
INVENTOR.
Howard C Baum
BY Chapin & Neal
ATTORNEYS.

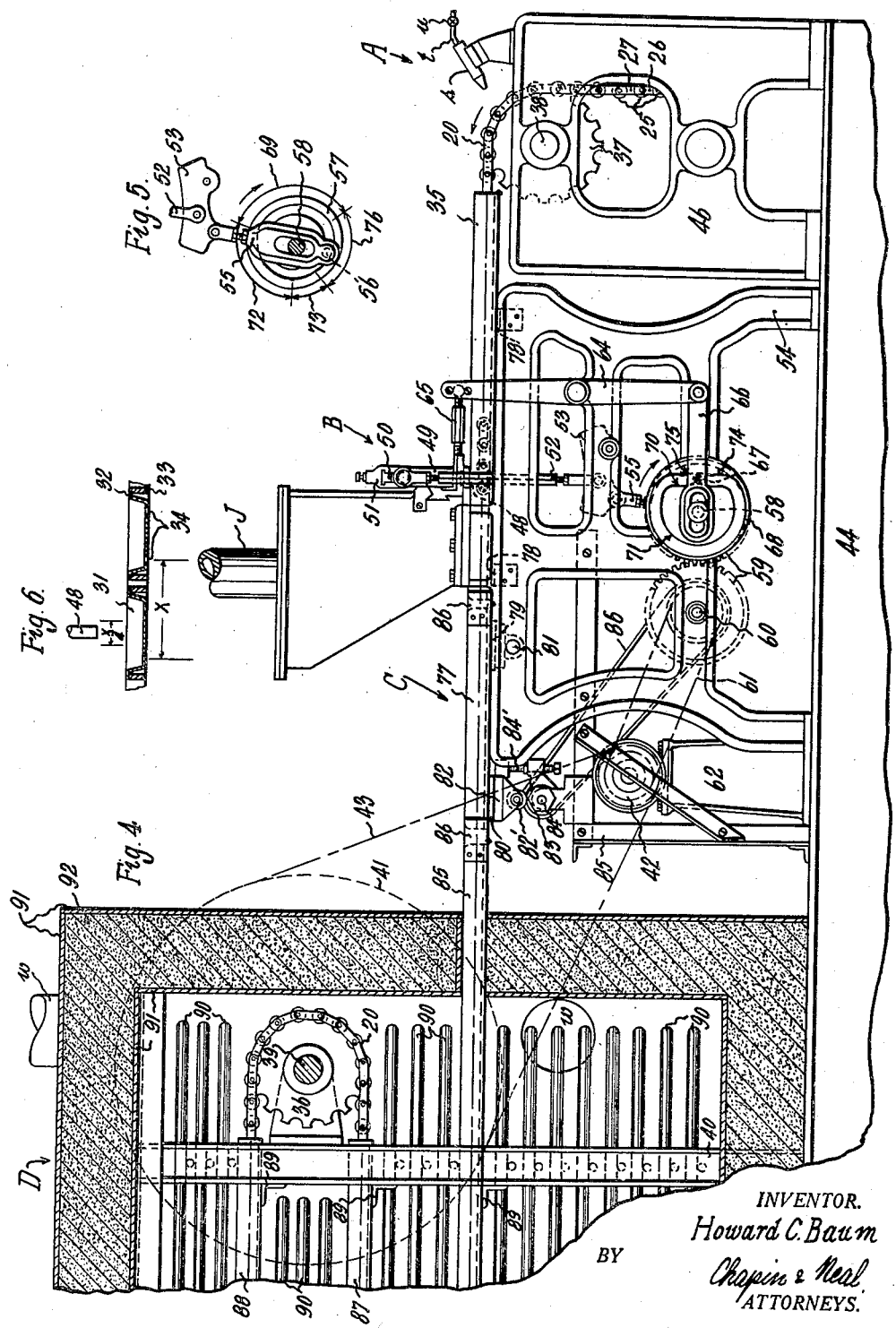

Jan. 5, 1932.                H. C. BAUM                1,839,731
                       CONFECTION MAKING APPARATUS
                        Filed Feb. 5, 1930     4 Sheets-Sheet 3
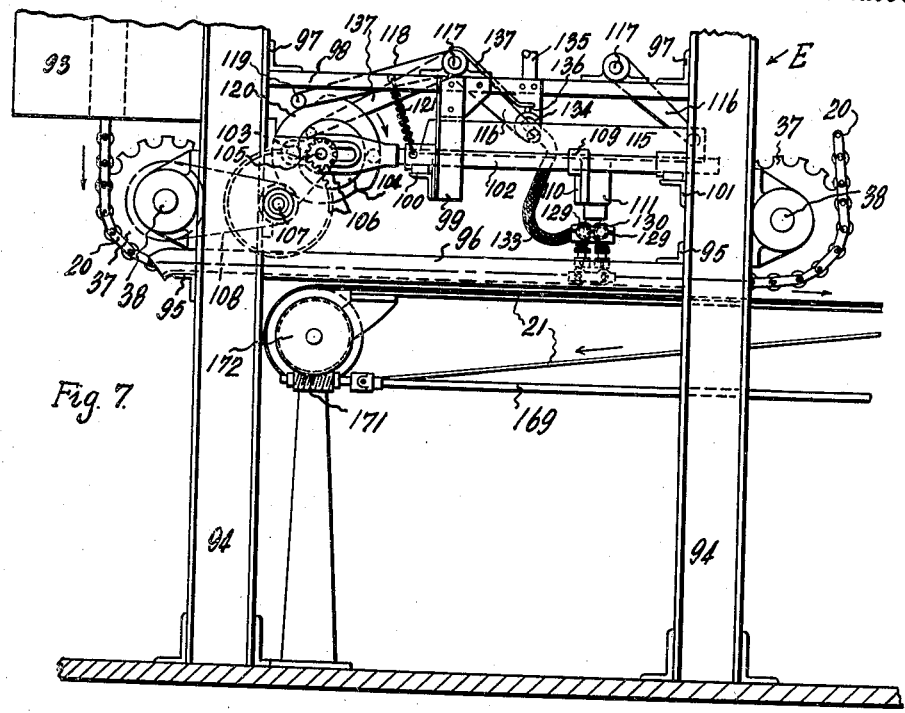
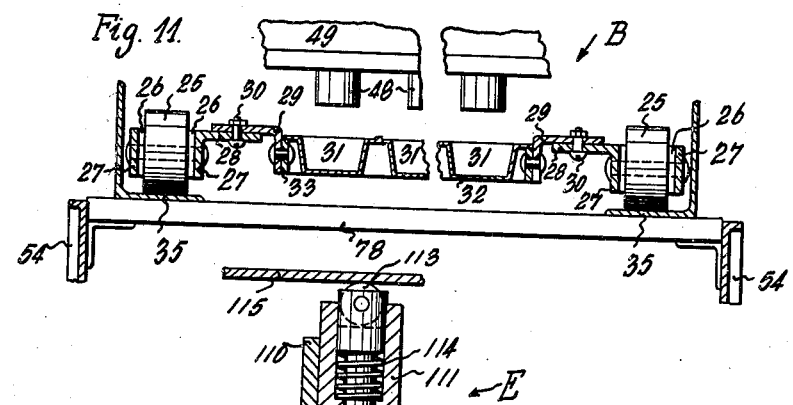
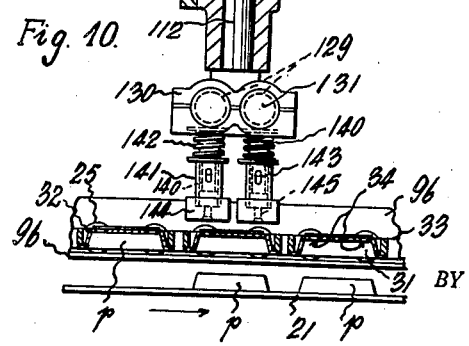
INVENTOR.
Howard C. Baum
Chapin & Neal
   ATTORNEYS.

Jan. 5, 1932. H. C. BAUM 1,839,731
CONFECTION MAKING APPARATUS
Filed Feb. 5, 1930 4 Sheets-Sheet 4

INVENTOR.
Howard C. Baum
BY Chapin & Neal
ATTORNEYS.

Patented Jan. 5, 1932

1,839,731

UNITED STATES PATENT OFFICE

HOWARD C. BAUM, OF MOUNT VERNON, NEW YORK, ASSIGNOR TO NATIONAL EQUIPMENT COMPANY, OF SPRINGFIELD, MASSACHUSETTS, A CORPORATION OF MASSACHUSETTS

CONFECTION MAKING APPARATUS

Application filed February 5, 1930. Serial No. 426,137.

This invention relates to an apparatus for the manufacture, by molding, of articles composed of various confectionery materials, as distinguished from chocolate, in a wholly automatic and preferably continuous manner. These articles may constitute what is known in the trade as "centers", i. e., cores which are subsequently coated, as with chocolate, to form coated confections. Or, the molded article may constitute the finished confection itself, as in the case of a gum drop, for example. The invention, in another aspect, relates not only to the manufacture of the "center" but also to the subsequent coating of it and the formation of a complete coated confection.

Work of a corresponding character has heretofore been accomplished in the trade in the following manner. The molds have been formed by making impressions in a body of starch contained in a tray. These trays, manually supplied to one machine, are automatically fed along and filled with starch, the mold impressions are formed and the molds filled with confection. The trays, containing the filled molds, are then carried away by hand, stacked up and allowed to remain until the last candies have set. Then these trays are carried by hand back to the aforesaid machine and placed therein. The machine automatically dumps the trays and the starch molds are broken up and disintegrated in the process. The mingled starch and candies are then automatically separated and the candies brushed, or otherwise cleaned to remove the starch. Then the candies are carried by hand to and fed into a candy coating machine. Two distinctly separate manufacturing operations are involved and there is a substantial time interval between them. Production does not proceed continuously and uniformly because the "center" making machine and coating machine are not related and coordinated and cannot be because of the time interval necessary for the setting of the centers, the breaking up of the starch molds and the separation of the centers from the starch and the cleaning of the centers. Also, the product has to be handled by operators and many manual operations are required.

As distinguished from prior practice, I provide an apparatus which is entirely automatic and in which production proceeds continuously, the ingredients being fed into the machine at one end and the finished product emerging at the other end, untouched by human hands.

More particularly, permanent molds, such as metal molds for example, are used as distinguished from the temporary starch molds, heretofore used for the purpose, and these are mounted on an endless conveyer which carries them, preferably continuously, past the several stations where the various operations are performed. The centers are cast in molds, caused to set, ejected from their molds and the molds returned for subsequent filling, all in a continuous and wholly automatic manner. Also, the centers, if they are to be coated, are delivered from the molds to conveying means which automatically carries them to and through a coating machine and preferably also to and through a cooling apparatus and finally, if desired, to a packing table or wrapping machine, whichever is required.

The successful solution of the problem of forming centers in the stated manner depends on the recognition of certain fundamental difficulties which occur when it is attempted to handle confectionery materials, such as fondants, gums and the like, in the same manner as chocolate. The same machine, which will satisfactorily and automatically form solid chocolate bars by molding will not work with confectionery materials, such as those mentioned. This explains why the trade has continued to follow the old practice of using the starch molds.

One difficulty is that the materials, of which the centers are made, stick to the mold tenaciously, whereas chocolate, being somewhat greasy, will not. Another difficulty is that the cast centers do not shrink, at least perceptibly, in their molds while chocolate does shrink materially. Chocolate cast in a metal mold can be readily removed by rapping the mold, whereas centers, or at least most of them, are not readily dislodged by the same treatment. Consequently, disintegrable molds of starch have been used for centers and the molds are broken up after the casting operation in order to get the confections out. Another point of difference in character between chocolate and centers is that the chocolate is hard while the centers are often, and desirably, considerably soft. The centers may have a shell or skin which is fairly firm while the interior may be rather soft. Consequently, the problem of ejecting centers from their molds is different from that of ejecting chocolate. The centers are more delicate and usually are not susceptible to the same treatment. For example, a nonyielding ejector might be used to enter a mold and poke out a cake of chocolate, cast therein, but the same means would pierce the shell of a "center" or otherwise mar or injure it during the ejecting operation.

My invention has for its object the provision of an apparatus for automatically making centers, or other confections, which are similar in general character, and also to an apparatus in which the centers are not only made but subsequently coated.

Among the important characteristics of my apparatus are the treatment of the mold surfaces, preparatory to casting, so that the cast confectionery material will not stick to these surfaces so tightly as to prevent ejection and, preferably, the use of special confection-ejecting means which will supply the nececsary force for the purpose without piercing, marring or otherwise injuring the confections. Each of these features may be used independently and the use of both conjointly is most desirable for the successful accomplishment of the stated work. These features are distinctively new in a molding apparatus combination and their use in the combination renders the apparatus successful for work of the stated character.

Other features of invention will appear as the detailed description proceeds and will be particularly pointed out in the appended claim.

The invention will be disclosed with reference to the accompanying drawings, in which:—

Fig. 1 is a small scale elevational view of the complete machine;

Fig. 2 is a sectional elevational view illustrative of the mold washing means;

Fig. 3 is a sectional elevational view illustrative of one of the mold greasing means;

Fig. 4 is an elevational view, drawn to a much larger scale, showing the molding machine for casting the centers and the entrance end of the tempering apparatus wherein the molded centers are caused to harden or set;

Fig. 5 is a detail view of a part of the molding machine;

Fig. 6 is a fragmentary sectional view illustrative of the mold filling operation;

Fig. 7 is an elevational view showing the means for ejecting the centers from their molds, together with the delivery end of the aforesaid tempering apparatus and the receiving belt of the confection coating machine;

Fig. 10 is a sectional elevational view taken on the line 10—10 of Fig. 9;

Fig. 11 is a large scale, fragmentary cross sectional view illustrative of the construction of the molds and mold conveyer and the mounting of the latter.

Referring first to Fig. 1; an endless mold conveyer, shown conventionally at 20, is mounted to travel, preferably continuously, in a path which carries the molds successively through mold greasing means A or A'; a molding machine B; a shaking table C; a tempering apparatus D, which may be either a heating or a cooling apparatus; a mold emptying means E; a mold washing means F; a draining section G, from which the molds return through a drying section H to the means A or A'. The confectionery material may be delivered from the floor I above the molding machine B through a chute J to such machine. The molds are filled at B; the molds are shaken, if and when necessary, at C to consolidate the material deposited therein; the confections are tempered by cooling or heating, whichever is necessary, in the apparatus D and the molds are emptied at E. The molded centers, ejected from their molds at E, fall through a short distance upon a conveyer 21, which carries the centers to and transfers them upon the pervious conveyer 22 of a coating machine L, wherein the centers are completely coated, usually with chocolate. The coated confections are delivered from conveyer 22 to a conveyer 23, which carries the articles through a cold box M, wherein the coatings of the confections are hardened. The finished product, now ready for wrapping or packing, is delivered by conveyer 23 from the right hand end of the machine to the conveyer 24, which carries the articles to a wrapping machine or packing table accordingly as the articles are to be packed by hand or wrapped automatically.

The apparatus is so large that it is usually desirable to distribute parts of it on different floors. Conveniently, the units A, B, C and D are located on the second floor N, and the units A', E, F, G, H, L and M on the ground floor O. The refrigerating machinery (not shown) which supplies the brine coils of the cold boxes D and M, may be located in the basement P.

Figure 8:
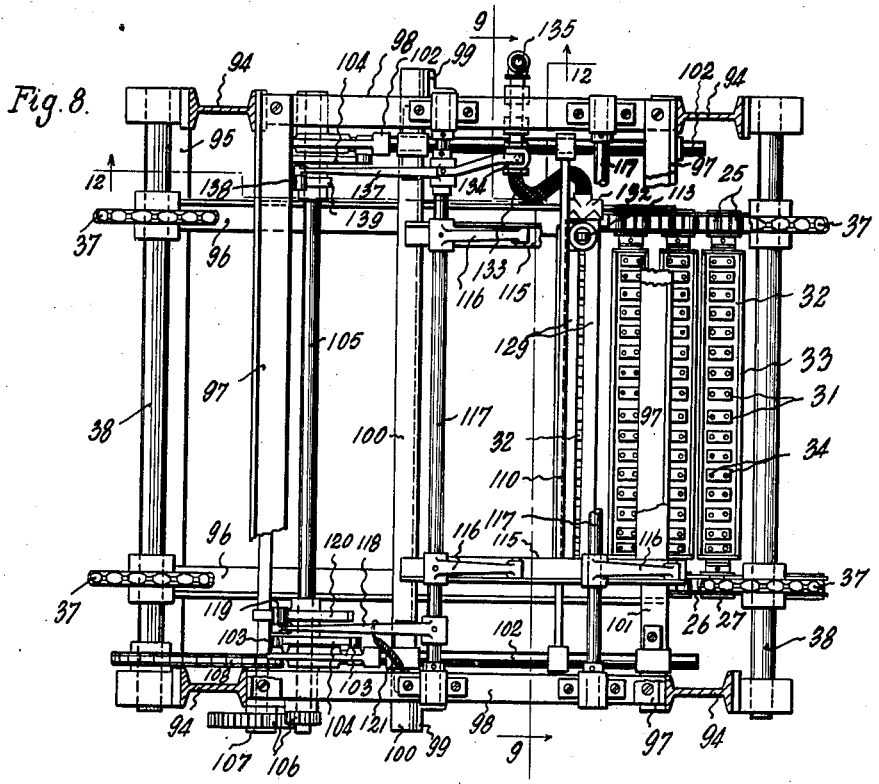
Fig. 8 is a plan view of the ejecting means.

The mold conveyer 20, comprises two laterally-spaced, roller chains between which the several molds are carried. In Fig. 11, the rolls of the chains are shown at 25, the pairs of inner links at 26 and the pairs of outer links at 27. The links 27 on the inner side of each chain have right angularly turned lugs 28 to each of which an angle iron lug 29 is pivotally connected by a stud 30. A plurality of molds 31 (sixteen as shown in Fig. 8) are formed in a pressed metal member 32, secured to a hollow rectangular frame 33 fastened at its ends, one to each of an opposed pair of the angle irons 30. These molds are clearly shown in cross section in Fig. 11 and in longitudinal section in Figs. 6 and 10. From Fig. 6, it will be seen that there are two small holes 34 through the bottom wall of each mold 31. There are a large number of these mold frames and they are closely spaced on their chains 20 as shown in Fig. 8,—being connected to alternate links of the same. The rolls 25 of the chains ride on suitable trackways, such as those shown at 35 in Fig. 11, being the trackways of the molding machine B.

Each chain of the mold conveyer is trained over a driving sprocket 36 (Fig. 1) and a series of idler sprockets 37, these sprockets being mounted in pairs on shafts 38, in the manner shown in Fig. 8, and the shafts being variously supported in any suitable way. The driving sprockets 36 (Fig. 4) are fixed to a shaft 39 which is supported near its ends in bearings carried by one of a series of pairs of upstanding channel irons 40, forming part of the frame of the cold box D. This shaft at one end extends outside the cold box and carries a sprocket 41, driven continuously from an electric motor 42 by a chain 43.

The several sprockets so direct the mold conveyer that it passes through the unit B in a horizontal path; thence in the same path into cold box D and nearly to the remote end thereof, whence it returns in an overlying horizontal path toward the entrance end of unit D, whence it again turns and passes in an overlying horizontal path to the remote end of unit D; thence in a vertically downward path to unit E; thence in a horizontal path through unit E; thence upwardly and then in a horizontal path through the sections F and G in which path the molds are inverted; thence backwardly in an underlying path to right the molds and drain the bottoms thereof; thence forwardly to again invert the molds and drain the same; and thence horizontally through sections H and A' and thence vertically upward to the greasing station A, and then back to the molding machine B.

The latter and the cold box D are mounted on longitudinally disposed I-beams 44, which rest on a series of transverse I-beams 45 resting on floor N. The beams 44 also serve to support pedestals 46, which are disposed adjacent the molding machine A and carry one of the idler sprocket shafts 38.

The first operation, that of greasing the molds 31, is performed at station A, or optionally at a station A' as will later be described. The equipment at station A consists of a nozzle *s* (Fig. 4), or battery of such nozzles, which are so located as to deliver a spray or sprays of some suitable greasing material upon the inner walls of each mold cavity 31, as the molds successively pass the nozzle or nozzles. Conveniently, the latter may be supported from pedestal 46, or in any other suitable way. The nozzles may be of any suitable type, as the desired purpose may be accomplished in various ways as will readily be appreciated by those skilled in the art. The showing of the nozzles *s* is merely conventional,—the details being unnecessary to an understanding of this invention. A supply pipe for grease is shown at *t*, with a control valve *u*, and grease under pressure may be forced through pipe *t* in any suitable way. Preferably, and as an example of one desirable means, an atomizing or nebulizing nozzle, somewhat similar to those used in oil burners, may be used and a suitable oil or a grease such as vaseline, for example, may be projected through the nozzle in mist-like form. The oil or grease particles are so finely divided that the spray appears much like fog. As a result, a very thin coating may be applied to the molds,— so thin as to be readily wiped off with the fingers without leaving more than a faint trace of the oil or grease thereon. It is important to apply the grease sparingly in this manner,—using just enough to prevent the confection, subsequently deposited, from sticking to the molds and avoiding any excess of grease which might soak into the confections. With the grease so applied, it matters little that the spray may reach the spaces between successive mold bars or between successive molds in the same bar, although I later describe an expedient by which such action may be avoided, if necessary or desired.

The next operation, that of molding,—is performed at station B. Referring to Fig. 4, the molding machine B may be a standard "depositor" except that the continuously operable mold conveyer 20 is substituted for the usual intermittently operable tray conveyer thereof and the step by step driving mechanism for the latter is dispensed with. From the supply hopper 47, the confection material is drawn out in measured charges by a series of pumps and ejected through nipples 48 (see also Figs. 6 and 11) into the underlying molds 31. The pump cylinders are contained in the body 49 shown in Figs. 2 and 11. The several piston rods of the pumps are carried by a common cross bar 50 (Fig. 4), mounted to reciprocate vertically in guides 51 carried by hopper 47. Each end of bar 50 is connected by a link 52 to a lever 53, pivoted to the adjacent one of the pair of side frames 54, which support the hopper 47. Each lever 53 is connected to one end of a link 55 which carries a roll 56 (Fig. 5) to ride in a path cam 57. The cams 57 are fixed to a shaft 58, mounted at its ends in frames 54 and the links 55 are slotted, as shown in Fig. 5, to slide on the shaft as a guide. The shaft 58 is driven by spur gears 59 from a shaft 60, which in turn is driven continuously from motor 42 by a chain 61 and suitable sprockets, as indicated. The motor 42 may be carried by a pedestal 62 secured to beams 44. The valve action of the pumps is effected by a so-called "cut off bar", which is reciprocated in proper timed relation to the stroke of the pump piston. The usual operating lever 64 and its link connection 65 for operating the cut off bar are shown in Fig. 4. Such lever is pivoted intermediate its ends to frame 54 and at its lower end is connected to a link 66, slotted to slide on shaft 58. Link 66 carries a roll 67 to ride in a path cam 68.

For a more complete disclosure of a depositor, operating generally in the same manner, reference is made to Carlson Patent No. 661,008, dated October 30, 1900. For the present purposes it should suffice to state that after the links 52 have effected the downward strokes of pump pistons (they are shown about half way down), they will come to rest due to the dwell portion 69 of cam 57. During this interval of rest of the pump pistons, the cut off bar will, due to the portion 70 of cam 68, be operated to close off the nipples 48 and connect the pump cylinders to hopper 47. The cut off bar then remains stationary, due to the dwell portion 71 of cam 68, while the part 72 of cam 57 causes the pump pistons to rise and draw in measured charges from hopper 47. The pistons dwell at the upper end of their strokes, due to the dwell portion 73 of cam 57, and at this time the cut off bar is actuated by the portion 74 of cam 68 to open the outlet nipples 48 and close communication between the pump cylinders and hopper 47. There is a dwell 75 on cam 68 to hold the cut off bar stationary during the down stroke of the pump pistons. Enough has been disclosed to show that the pistons and valve mechanism are operated in proper timed relation with each other and that they are driven by the mold conveyer.

The driving connections are such that shaft 58 makes one complete revolution, causing one complete cycle of operation of the depositor, while conveyer 20 is moving a distance equal to that between the center lines of two successive molds, or the distance $x$ shown in Fig. 6. The discharge from the nipples 48 is caused by the portion 76 of cam 57. Such portion is substantially 90 degrees in angular extent. Therefore, discharge from the nipples takes place intermittently during an interval of movement of the conveyer 20 equal to one quarter of the distance $x$. As shown in Fig. 6, the molds 31 are so located on the conveyer, with relation to the interval of discharge from nipples 48

(represented by the dimension $\frac{x}{4}$), that all of the discharge will be received in underlying molds 31 and so that the deposits will be spread to some extent due to the movement of the conveyer during the discharge interval.

The molds 31, having been filled, pass successively along to a suitable shaking table C. The use of the shaking table is optional. It is not always necessary and is provided for use when required. As shown, this table consists of angle iron trackways 77 which aline with the trackways 35 of the depositor and to which an up and down motion is imparted. The trackways 35 are supported on cross bars 78, the ends of which are secured to the side frames 54, as shown in Fig. 11. Similar cross bars 79 and 80 are connected to the pair of angle irons 77. Cross bar 79 carries bearings which are mounted to turn on a shaft 81, secured at its ends in side frames 54. Cross bar 80 carries brackets 82 in which are mounted rolls 82', riding on hexagonal cams 83, fixed to a shaft 84. The latter is supported in a frame 85. secured to frames 54, and is driven by a chain 86 and suitable sprockets from shaft 60. It will be clear that the trackways 77, pivoted at 81, will be rapidly vibrated up and down by cams 83 and that the molds 31, as they ride along these trackways, will be shaken. This consolidates the material deposited in the molds. The extent of the vibratory motion imparted to the molds may be varied by adjustment of screws 84' which limit the extent of downward travel of trackways 77 by abutment with brackets 82. The gaps between the vertical legs of angle irons 77 and the corresponding legs of the adjacent trackways 35 and the trackways 85 of cold box C may be bridged by plates 86, one set of which are secured to the trackways 85 and the other to trackways 77, as indicated.

The tempering apparatus D has three sets of parallel trackways 85, 87 and 88 arranged one above the other. These are secured to angle iron cross bars 89 and the cross bars are connected at their ends to channel iron uprights 40, the whole constituting a skeleton frame-work which rests upon the I-beams 44. This frame-work also carries bearings to support the shaft 39 of driving sprockets 36 (Fig. 4) and the shafts 38 of the two sets of idler sprockets 37 (Fig. 1). Brine coils 90 are also suitably supported from this framework, as indicated in Fig. 4, and are located below trackways 85, in the space between trackways 85 and 87, in the space between trackways 87 and 88 and also above trackways 88. These coils extend from end to end of cold box D. The framework, above described, is housed in by double walls 91 of sheathing between which is insulating material 92, such as cork for example. A vertical tunnel 93, constructed in the same general manner, extends from the delivery end of cold box D vertically downward to the emptying apparatus E. It is to be noted that the molds 31 in their first course of travel through cold box D travel right side up. By the time that the molds reach the end of such course of travel the confection therein has set sufficiently so that the molds may be safely inverted, as is necessary with the described arrangement for the second course of travel.

When the confections require heating rather than cooling in order to set, I provide by the pipes $v$ and $w$ (Fig. 1) for the circulation of heated air through apparatus D. The cooling coils 90 may be shut off and a valve $y$ in pipe $v$ opened to admit warm air. It is also within the province of the invention to effect cooling by circulating cold air through apparatus D by means similar to those just described and as an alternative to the use of the coils 90.

Referring now to Figs. 7 and 8, the emptying mechanism is mounted on a frame including two pairs of vertical I-beams 94 extending from floor O to floor N and secured to both. These beams carry bearings to support the shafts 38 of idler sprockets 37. Extending across between the beams 94 of each pair, are angle irons 95 which support angle iron trackways 96 for the mold conveyer (see also Fig. 9). The beams 94 of each pair are also connected together at a higher level by angle irons 97 and secured thereto are inverted channel irons 98, which extend from each beam 94 of one pair to the corresponding beam of the other pair. Secured at its upper end to each channel iron 98 and depending therefrom are two angle irons 99, which are connected together at their lower ends by an angle iron 100. A similar angle iron 101, arranged at the same level, connects the right hand pair of I-beams 94.

Mounted in bearings, carried by angle irons 100 and 101, for horizontal movement are two laterally-spaced members 102. The left hand end of each member 102 carries two rolls 103, which engage the periphery of a heart cam 104 at diametrically opposite points. Cams 104 are fixed to a shaft 105, mounted in bearings secured to the left hand pair of beams 94. The members 102 are slotted, as indicated, to slide on shaft 105. Shaft 105 is connected by spur gearing 106 to a shaft 107, also mounted in the last named bearings, and shaft 107 is driven by a chain 108 and suitable sprockets from the adjacent shaft 38 of the mold conveyor. The driving connections between shafts 38 and 105 are such as to turn the latter one complete revolution while the former moves the mold conveyer by the distance $x$ heretofore referred to. The heart cam, of course, produces uniform motion of members 102 and the speed of the latter is equal to that of the molds. The travel of such members is, however, only half the distance $x$.

Each member 102 has fixed thereon, a depending arm 109 and these arms are connected by a cross bar 110. Secured to bar 110 in laterally spaced relation are two cylinders 111 (Fig. 9) in which plungers 112 (Fig. 10) are mounted for vertical sliding movement. The upper ends of the plungers carry rolls 113 and the plungers are urged upwardly by springs 114. These plungers are arranged to be simultaneously depressed by the following means. A pair of laterally-spaced, longitudinally disposed, angle irons 115 (Fig. 9) are provided, each overlying the rolls of two of the plungers in such a way as to maintain contact while the plungers are being moved back and forth by the heart cam. Each angle iron is suspended by two links 116 (Fig. 7) fixed one to each of two cross shafts 117, each of which is rotatably supported near its ends in bearings on channel irons 98. Fixed to one of these shafts is a lever 118, carrying at its free end a roll 119, riding on the periphery of a cam 120, fixed to shaft 105. When roll 119 is riding on the high portion of cam 120, the angle irons 115 and plungers 112 will be depressed and, when riding on the low portion, the plungers will rise to the limit permitted. The angle irons 115 are preferably lifted by a separate spring 121.

It will thus be clear that the plungers 112 have a vertical as well as a horizontal reciprocating movement. The plungers are shown at the right hand end of their horizontal movement and elevated. During the next half revolution of cam 104 the plungers will move horizontally to the left while they remain elevated. Shortly after the plungers start their horizontal movement to the right, the leading end of the high part of cam 120 will engage roll 119 and cause the plungers to be depressed and they are held depressed for a substantial part of such horizontal movement, rising shortly before the plungers reach the extreme right hand positions illustrated.

Figure 12:
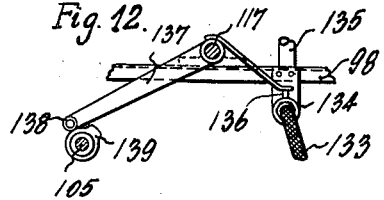
Fig. 12 is a sectional view taken on the line 12—12 of Fig. 8.

The pair of plungers 112 carry between them a pair of transversely disposed pipes 129 which are mounted horizontally and in spaced parallel relation,—the center to center distance between these pipes being equal to the center to center distance between the two holes 34 in each mold 31 (Fig. 10). These pipes are held between two pairs of clamps 130 and the upper member of each clamp is fixed to the lower end of a plunger 112. One end of each pipe is closed by a cap 131 (Fig. 9) and at the other end each pipe is fixed in a common manifold 132 (Fig. 8) which is connected by a flexible pipe 133 to a valve 134. The latter is suitably supported, as indicated in Fig. 12, from one of the inverted channel irons 98. Also connected to valve 134 is a pipe 135 leading to a suitable source of fluid under pressure, such as compressed air. This valve is of the self closing type having a plunger 136 which, when depressed from the position illustrated in Fig. 12, will open the valve and admit air under pressure to pipes 133 and 129. As a means for opening the valve, a lever 137 is mounted at a point intermediate its ends to turn freely on one of the shafts 117. One end of this lever overlies valve plunger 136, while the other end carries a roll 138 to ride on the periphery of a cam 139, fixed to the same shaft 105 which carries the cams 104 and 120. Cam 139 is so constructed, and so located on shaft 105 relatively to the last named cams, as to open the air valve 134 after the cam 120 has lowered the plungers 112,—also to hold the valve open during the necessary part of the horizontal travel of the plungers to the right (as viewed in Fig. 7) and to close the valve before these plungers 112 begin to rise. The time during which the valve is held open may have to be varied to suit different conditions but the valve should not open until the plungers 112 have been lowered and it should close before the latter begin to rise.

Figure 9:
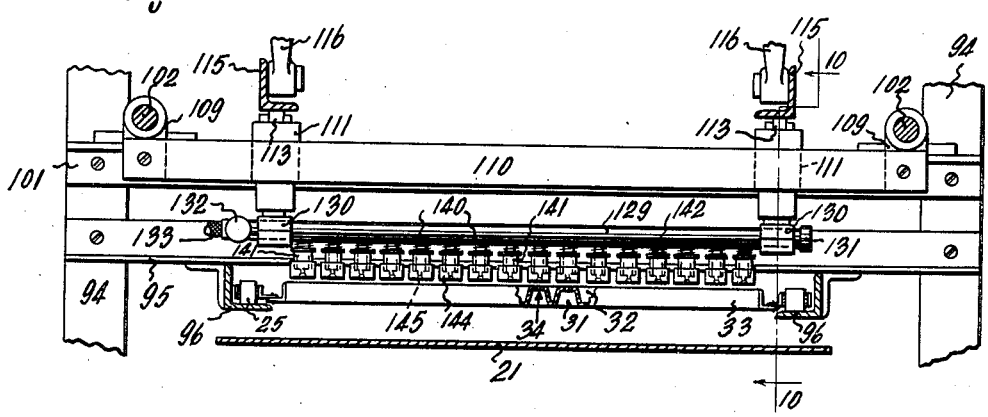
Fig. 9 is a cross sectional view taken on the line 9—9 of Fig. 8.

Referring to Fig. 9, each of the air pipes 129 has fixed thereto a plurality of vertically depending nipples 140, one for each of the molds 31 in a mold frame 33, and so spaced that their axes coincide with the axes of the holes 34 in the underlying molds 31. Slidable on each nipple 140 (Fig. 10) is a closely fitting sleeve 141, the upper end of which is urged downwardly by a spring 142. A cross pin 143, fixed in each nipple, has its ends disposed in vertical slots in the encompassing sleeve, whereby to limit the extent of downward movement of the sleeve by spring 142. Fixed to the lower end of each sleeve is a rubber piece 144 which as an axial opening 145 therethrough. It will be clear that as the plungers 112 descend, the yielding rubber pieces 144 will be tightly pressed against the underlying walls of the several molds 31 in the mold frame 33 and that the holes 145 therein will register with the holes 34 in the molds. As the plungers are then travelling in the same direction and at the same speed as the molds, communication between the registering holes will be maintained during the period when the air valve 134 is opened by cam 139. Air pressure will then act on the confections p and eject them from their molds,—the ejected articles falling a short distance upon the underlying belt 21, as indicated in Fig. 10.

Provision has been made, as will be clear from Fig. 7, so that additional air ejectors, such as just described, may be installed on the reciprocating members 102. These members are long enough to receive two more pairs of cylinders 111 and other ejectors may be provided, if found necessary or desirable to secure the intended results under different conditions which may be encountered.

It should be pointed out here that the heart cam 104 is so constructed that the length of the horizontal stroke of members 102 is half the dimension $x$, i. e., the center to center distance between successive molds on the mold conveyer. If the air ejectors are originally set to properly engage the molds on the mold conveyer, they will remain in such relation. Consider that one row of holes 145 are in registration with one row of holes 34 in the molds at the start of the horizontal stroke of members 102 toward the right (as viewed in Figs. 7 or 10), these holes remain in registration while such horizontal stroke is effected,—the members 102 and the mold moving in the same direction and at the same speed through the distance $$\frac{x}{2}.$$

Next, the members 102 move backward relatively to the mold but at the same rate of speed so that as the mold moves forward an additional distance equal to $$\frac{x}{2},$$

the members 102 will have moved a like distance in the opposite direction, making a total relative movement equal to $x$, thereby bringing each particular row of outlet holes 145 back into position to register with the corresponding row of holes 34 in the next succeeding mold on the mold conveyer.

The mold conveyer, after the molds 31 have been emptied, travels upwardly from the emptying station E and thence horizontally, as shown in Fig. 1. The mold conveyer, during such horizontal travel, and the ensuing travel necessary to reach the mold filling station, is enclosed by a housing 148 which preferably includes a series of removable top wall sections or covers 149. Under some conditions of operation, especially where the accelerated drying of the washed molds, as later described, is not needed or desired, these covers may be removed, except possibly those over the washing station F.

The molds 31 may occasionally need to be washed and I provide a washing station F, for use whenever necessary. At this station, the housing 148 has a lower wall 155 which slopes steeply downwardly from a point near baffle 153 and meets another floor 156, sloping downwardly from the extreme right hand end of housing 148. A drain pipe 157 is connected to the bottom wall 155 near its junction with wall 156. Overlying these walls 155 are upper and lower series of transversely disposed pipes 158 between which the mold conveyer passes. Referring now to Fig. 2, the pipes 158 of both series are connected to a common manifold 159 and this in turn is connected to a supply pipe 160 having a valve 150 which may be shut off when the washing operation is not required. In the under side of the pipes of the upper series and in the upper sides of the pipes of the lower series are jet orifices 161 to direct jets of hot water, or any other desired washing medium, in various radial directions so as to reach all parts of the molds for washing the same. It will be noted that both the inside and outside of each mold is thoroughly washed by the sprays. The bulk of the washing water is received on the floor 155 and passes at once to the drain pipe 157.

It is necessary, however, to thoroughly drain the molds and accordingly the floor 156 is provided to take care of the relatively small amounts of water which drip from the molds at the draining station G. At this station, the inside surfaces of the mold drain first as the mold conveyer carries the inverted molds from the pipes 158 towards the next encountered set of idler sprockets 37 (Fig. 1). The mold conveyer then turns backwardly, thus righting the molds and allowing the outer surfaces to drain, after which the conveyer turns forwardly and again inverts the molds to allow a final draining of the inner surfaces thereof.

The molds may in many cases dry sufficiently during their return travel through section H to the mold filling machine without any special provisions to accelerate such action. I may, however, accelerate the drying by forcing in hot air into the right hand part of the housing 148, as through the pipe 162, such air leaving the housing at any suitable point, as at the left hand end thereof.

The invention as thus far described, is complete in itself as a means for forming and delivering at any suitable point, or to any suitable means, molded confection centers. Preferably, however, these centers are coated, commonly with chocolate.

The coating machine may be of any suitable form. As shown, it is of the general type disclosed in U. S. Letters Patent No. 1,323,948, dated December 2, 1919. For the present purposes, it will suffice to state that coating such as chocolate, contained in a supply tank 163 (Fig. 1) in the base of the machine is forced by a pump 164 through a conduit 165 into the shower pan 166, from which it emerges in a transverse stream or streams to coat the confections, carried through the latter on the wire mesh belt 22. The usual bottom coating rolls are shown at 151 and the usual fan for removing excess coating from the confections at 168. The excess coating passes through the belt 22 and is returned to tank 163 for reconditioning in the usual manner.

The coating machine, as customary, is provided with a driving means of its own and all parts of the machine are suitably connected to be driven therefrom. It has been thought unnecessary to illustrate all the driving connections, as they are sufficiently suggested in the patent above referred to, with the exception of the drive for the wire belt 22 and one suitable drive for the latter is shown in Magniez Patent No. 735,890, dated August 11, 1903. The latter patent also shows a drive for the belts which feed confections to belt 22 and deliver coated confections therefrom. In Fig. 1, I have indicated shafts 169 and 170 extending from the machine L toward the remote ends of belts 21 and 23, respectively, and each carrying a worm 171 which drives a worm gear 172 on one of the supporting rolls of its belt.

The cold box M has not been described in detail as it is well known in the art. Essentially, it forms a refrigerating chamber or tunnel through which the conveyer 23 travels. Examples of cold boxes suitable for the purpose will be found in U. S. Letters Patent Nos. 1,567,633 and 1,667,765 dated December 29, 1925, and May 1, 1928, respectively.

An alternative form of greasing apparatus is shown at A'. The arrangement, there shown, is preferable in cases where the grease is not so carefully and sparingly applied and overcomes any objection, which may be raised, against applying the grease to the spaces between successive mold frames or between adjacent molds in the same frame. As an example, I provide an endless stencil band 173 (Fig. 3), mounted on pulleys 174 and driven by projections 175 on one of these pulleys, which projections engage in perforations near the edges of the band. One of the sprockets 175 is driven by spur gearing 176 from the adjacent idler sprocket 37, and thus from the mold conveyer and at the same speed. The band 173 in its upper horizontal stretch moves in underlying and contiguous relation with the mold frames 33, and in the same direction and has openings so located as to register with the openings in the molds. Thus, the spaces between successive mold frames and between adjacent molds in the same mold frame are bridged and covered, leaving open only the mold cavities 31. The openings in the stencil band will, of course, be varied to suit the size and shape of the molds. The molds are sprayed by a nozzle or nozzles 176', which are suitably supported inside the housing 148. The molds travel upside down while being sprayed, and if there is excess grease applied thereto, the excess can drain from the inverted molds,—being received in a sump 177 formed in housing 148. I have indicated in Fig. 1, a pump 178 driven by an electric motor 179. This pump takes oil or grease from a supply tank 180, by means of a pipe 181, and forces it to the nozzle 176. A pipe 182, valved at 183, may conduct any grease in sump 177 back to pump 178.

In operation, the mold conveyer 20, preferably travelling continuously as disclosed, carries each mold 31 successively past the stations A or A', B, C, D, E, F, G and H, in a closed loop path. The molds are oiled or greased at A or A', preferably with a very thin coating, such as results from the use of an atomizer as described. The molds, having been greased, pass successively below the nipples 48 of the depositor and receive measured charges of hot fondant, gum or any other confectionery material. The discharge from nipples 48 is timed with respect to the mold conveyer so as to occur only while the molds 31 underlie the nipples. The molds, then travelling right side up, become filled with the fluent confectionery material and, as shown, there is some spreading of the material in the molds due to the movement of the molds during the interval of deposit. This is desirable with relatively long molds, such as those shown, but is not necessary where smaller molds, such as would be used for the common, roughly conical-shaped centers. The molds, having been filled, may be shaken by passing over the vibrating section C, whenever such action is necessary or desirable. The shaking action, in many cases, is not necessary. The filled molds then enter the tempering apparatus D, where they are subjected to cooling or heating, whichever is necessary to cause the molded centers to harden or set. The molds travel right side up in apparatus D, during their first course of travel therein, and the molded centers become sufficiently set so as not to run out when the molds are inverted during their second course of travel. The length of travel of the molds through apparatus D is such that the centers become thoroughly set as they emerge therefrom and pass to station E. The molds in passing through station E, travel upside down and in overlying and closely adjacent relation with the feed belt 21 of the chocolate coating machine and are successively subjected to blasts of air, or other fluid under pressure, emitted from the passages 145. The ejected molded centers fall a short distance and are received on belt 21 which carries them to the belt 22 of the coating machine. The centers are coated in machine L in the usual way and then delivered to belt 23 of cold box M. Here, the coatings are cooled and hardened and when the confections emerge from cold box M they are finished and ready for packing or wrapping.

The problem of molding cream centers is somewhat different than that of molding solid chocolate. Chocolate, when cooled, does not stick to a metal mold. Also, chocolate shrinks perceptibly in the molds. Consequently, when the molds are inverted, the molded articles of solid chocolate may be readily removed by rapping the bottom wall of the mold. Many, if not all, of the materials used for centers in chocolate coated candies and also those used for uncoated candies, such as gum drops, for example, cling tenaciously to metal molds. Moreover, the shrinkage is not percepticle. Consequently, it has not been commercially feasible heretofore, to manufacture such centers, except by the old-time method of casting them in molds formed in starch. After the centers have cooled in their starch molds, the molds are disintegrated, the starch sifted away from the centers, and the centers brushed free of starch. Manual operations are required and the manufacturing operation is not continuous. Attempts to continuously manufacture centers by the methods used in making solid chocolate bars, have not been successful because the confectionery materials used for centers does not act in the same way as chocolate.

My apparatus makes possible the continuous manufacture, not only of centers of cream and other confectionery materials, as distinguished from chocolate, but also of complete chocolate coated confections, all in one continuous, wholly-automatic operation, in which the ingredients and the finished product need not be touched by human hands. This apparatus is feasible for work of this character, where others have failed, because of two things. First, the means for oiling or greasing the molds, in a practical and unobjectionable way, enables me to remove the cast centers made of confectionery material, which would otherwise stick to the molds. Second, the ejecting means described will forcibly eject the cast centers from their molds, where rapping in many cases would fail. It is important for this class of work to enter the mold and "poke out" the center. Mechanical devices, if used for this purpose, would pierce, compress or mar the center but the air under pressure acts on the centers with the requisite force without injuring them. The centers, in many cases, are soft inside with only a shell that is at all hard. It will be appreciated that the ejector must deliver a cushioned blow to perform the work satisfactorily on confections of such character and the use of air, or other fluid under pressure, does the work satisfactorily.

I believe that I am the first to provide for the formation of centers of confectionery material in a continuous and wholly automatic manner and I desire to claim my invention in the broadest possible legal manner.

By the use of the term "confectionery material" in the appended claim, I mean the various materials used in the trade for articles called "centers" and materials other than solid chocolate. I also mean materials used for uncoated confections, of which the gum drop is one example.

What I claim is:

Apparatus for making confections, comprising, a series of molds, confection depositing means, confection setting means and confection ejecting means, conveying means to carry the molds successively through said several means, means for spraying the surfaces of the mold cavity of each mold prior to its passage through the depositing means with a thin coating of finely-divided, atomized, greasy substance, and means for preventing the greasy spray from reaching other surfaces of the mold and from entering the spaces between adjacent molds.

In testimony whereof I have affixed my signature.

HOWARD C. BAUM.